(12) United States Patent
Beeston et al.

(10) Patent No.: US 8,565,067 B2
(45) Date of Patent: Oct. 22, 2013

(54) APPARATUS, SYSTEM, AND METHOD FOR LINK MAINTENANCE

(75) Inventors: Ralph Thomas Beeston, Tucson, AZ (US); Thomas William Bish, Tucson, AZ (US); Joseph Whitney Dain, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 12/351,661

(22) Filed: Jan. 9, 2009

(65) Prior Publication Data
US 2010/0180147 A1 Jul. 15, 2010

(51) Int. Cl.
*G06F 11/07* (2006.01)

(52) U.S. Cl.
USPC .............................. 370/216; 714/2; 713/176

(58) Field of Classification Search
None
See application file for complete search history.

(56) References Cited

U.S. PATENT DOCUMENTS

| | | | |
|---|---|---|---|
| 5,418,939 A | 5/1995 | Fredericks et al. | |
| 5,925,137 A * | 7/1999 | Okanoue et al. | 714/4.1 |
| 6,243,774 B1 | 6/2001 | Eide et al. | |
| 6,973,651 B1 * | 12/2005 | Ching et al. | 718/100 |
| 7,373,545 B2 * | 5/2008 | Leveille et al. | 714/4.4 |
| 2004/0078534 A1 * | 4/2004 | Scheid | 711/162 |
| 2006/0187818 A1 | 8/2006 | Fields, Jr. et al. | |
| 2007/0130305 A1 * | 6/2007 | Piper et al. | 709/223 |
| 2008/0133962 A1 | 6/2008 | Bofferding et al. | |

* cited by examiner

*Primary Examiner* — Gregory Sefcheck
*Assistant Examiner* — Steve Young
(74) *Attorney, Agent, or Firm* — Kunzler Law Group

(57) ABSTRACT

An apparatus, system, and method are disclosed for link maintenance. A plurality of state machines operate a plurality of first links between data management nodes with each first link in an online state. A transition module transitions the plurality of first links from the online state to a degraded state and from the online state to an offline pending state in response to an offline request. The transition module further transitions the plurality of first links from the degraded state to an online pending state when a degraded link time interval expires and from the offline pending state to an offline state if all pending tasks on the plurality of first links are completed. The transition module further transitions the plurality of first links from the online pending state to the online state if each first link is validated.

20 Claims, 6 Drawing Sheets

APPARATUS, SYSTEM, AND METHOD FOR LINK MAINTENANCE

BACKGROUND OF THE INVENTION

1. Field of the Invention

This invention relates to links and more particularly relates to link maintenance.

2. Description of the Related Art

Data processing systems (DPSs) often use links to communicate commands and data between data management nodes. Redundant links may be used to assure that if first links fail, second links can continue to communicate commands and data between data management nodes.

Unfortunately, in order to change the configuration of the links, all data management nodes must be taken offline to prevent failures to the DPS. Forcing the data management nodes offline may impair the DPS for a significant period of time.

SUMMARY OF THE INVENTION

From the foregoing discussion, there is a need for an apparatus, system, and method that automate link maintenance. Beneficially, such an apparatus, system, and method would not require forcing one or more data management nodes offline by allowing concurrent maintenance of one or more links.

The present invention has been developed in response to the present state of the art, and in particular, in response to the problems and needs in the art that have not yet been fully solved by currently available apparatus, systems, and methods for link maintenance. Accordingly, the present invention has been developed to provide an apparatus, system, and method for link maintenance that overcome many or all of the above discussed shortcomings in the art.

The apparatus for link maintenance is provided with a plurality of modules configured to functionally execute the steps of operating a plurality of first links, detecting a connection failure, transitioning the plurality of first links from the online state to a degraded state, transitioning the plurality of first links from the online state to an offline pending state, completing pending tasks, transitioning the plurality of first links from the degraded state to an online pending state, validating each first link, transitioning the plurality of first links from the offline pending state to an offline state, and transitioning the plurality of first links from the online pending state to the online state. These modules in the described embodiments include a plurality of state machines, a detection module, a transition module, a completion module, and a validation module.

The plurality of state machines operate a plurality of first links between data management nodes with each first link in an online state, wherein tasks are communicated over the plurality of first links in the online state. The detection module detects a connection failure of at least one first link. The transition module transitions the plurality of first links from the online state to a degraded state in response to detecting the connection failure.

The transition module further transitions the plurality of first links from the online state to an offline pending state in response to an offline request. The completion module completes pending tasks on each first link during the offline pending state. The transition module further transitions the plurality of first links from the degraded state to an online pending state when a degraded link time interval expires. The validation module validates each first link during the online pending state. The transition module further transitions the plurality of first links from the offline pending state to an offline state if all pending tasks on the plurality of first links are completed or in response to a force offline command. The transition module further transitions the plurality of first links from the online pending state to the online state if each first link is validated.

A system of the present invention is also presented for link maintenance. The system may be embodied in a data processing system (DPS). In particular, the system, in one embodiment, includes a plurality of data management nodes, a plurality of first links, a plurality of state machines, a detection module, a transition module, a completion module, and a validation module.

The plurality of first links connect the data management nodes. The plurality of state machines operate the plurality of first links with each first link in an online state, wherein tasks are communicated over the plurality of first links in the online state.

The detection module detects a connection failure of at least one first link. The transition module transitions the plurality of first links from the online state to a degraded state in response to detecting the connection failure. The transition module further transitions the plurality of first links from the online state to an offline pending state in response to an offline request. The completion module completes pending tasks on each first link during the offline pending state.

The transition module further transitions the plurality of first links from the degraded state to an online pending state when a degraded link time interval expires. The validation module validates each first link during the online pending state. The transition module further transitions the plurality of first links from the offline pending state to an offline state if all pending tasks on the plurality of first links are completed else in response to a force offline command. The transition module further transitions the plurality of first links from the online pending state to the online state if each first link is validated.

A method of the present invention is also presented for link maintenance. The method in the disclosed embodiments substantially includes the steps to carry out the functions presented above with respect to the operation of the described apparatus and system. In one embodiment, the method includes operating a plurality of first links, detecting a connection failure, transitioning the plurality of first links from the online state to a degraded state, transitioning the plurality of first links from the online state to an offline pending state, transitioning the plurality of first links from the degraded state to an online pending state, transitioning the plurality of first links from the offline pending state to an offline state, and transitioning the plurality of first links from the online pending state to the online state.

A plurality of state machines operate a plurality of first links between data management nodes with each first link in an online state, wherein tasks are communicated over the plurality of first links in the online state. A transition module transitions the plurality of first links from the online state to a degraded state in response to detecting the connection failure of at least one first link. The transition module further transitions the plurality of first links from the online state to an offline pending state in response to an offline request, wherein the offline pending state completes pending tasks on each first link.

The transition module further transitions the plurality of first links from the degraded state to an online pending state when a degraded link time interval expires, wherein the online pending state validates each first link during. The transition module further transitions the plurality of first links from the offline pending state to an offline state if all pending tasks on the plurality of first links are completed else in response to a force offline command. The transition module further transitions the plurality of first links from the online pending state to the online state if each first link is validated.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention automates link maintenance. Beneficially, such an apparatus, system, and method would not require forcing one or more data management nodes offline by allowing concurrent maintenance of one or more links. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising computer readable code stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
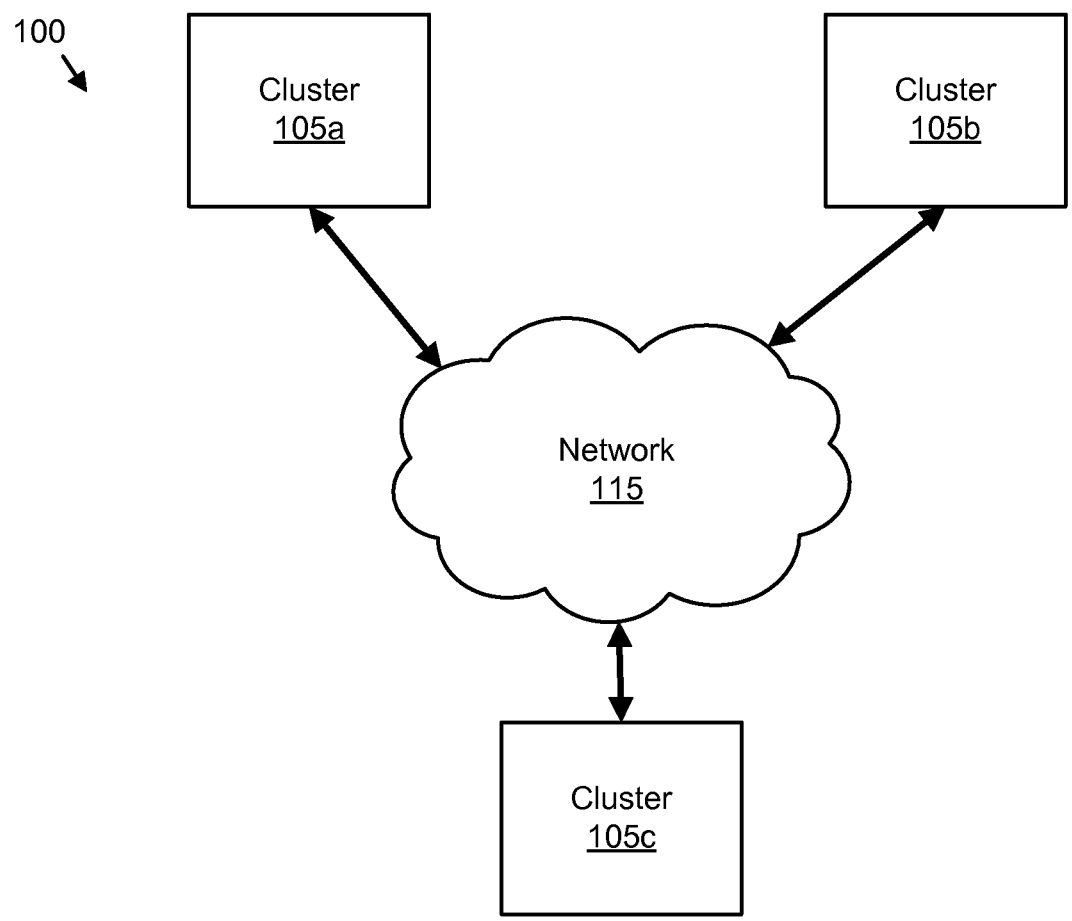
FIG. 1 is a schematic diagram illustrating one embodiment of a data processing system (DPS) in accordance with the present invention.

FIG. 1 is a schematic diagram illustrating one embodiment of a data processing system (DPS) 100 in accordance with the present invention. The DPS 100 includes a plurality of clusters 105*a-c* and a network 115. Although, for simplicity, the DPS 100 is shown with three (3) clusters 105*a-c* and one network 115, any number of clusters 105 and networks 115 may be employed.

The network 115 may be selected from a dedicated fiber network, a local area network (LAN), a wide area network (WAN), the Internet, an Ethernet network, a token ring network, an enterprise intranet, and/or the like. The network 115 may comprise one or more data management nodes that may provide one or more physical and/or logical paths for transferring the data as is well known to those of skill in the art. For example, the network data management nodes may comprise one or more switches, routers, bridges, wireless LAN access points, or the like. The network 115 may establish communication between the plurality of clusters 105*a-c*. The communication over the network 115 may be through fiber optic cables, wires, wireless, and/or the like as is well known to those of skill in the art.

Each cluster 105 may include one or more network switches, power distribution units (PDUs), uninterruptible power supplies (UPSs), and the like. In addition, each cluster 105 may include an external switch that may allow extra-cluster access to one or more data management nodes.

In one embodiment, the DPS 100 provides data storage, data replication, data manipulation, or the like services by using one or more links between a plurality of data management nodes for one or more clients or hosts. For example, the client may transfer data stored on a storage device of the first cluster 105*a* to a storage device of the second cluster 105*b* to replicate the data by using a link between the first cluster 105*a* and the second cluster 105*b* as will be described hereafter.

The DPS 100 may be a TS7700 storage cluster produced by International Business Machines Corporation (IBM) of Armonk, N.Y.

Figure 2:
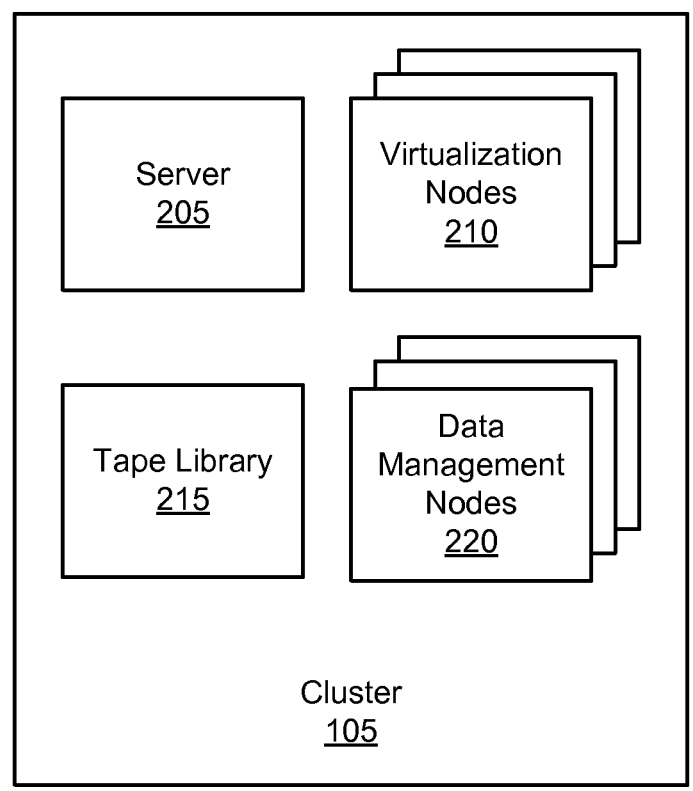
FIG. 2 is a schematic block diagram illustrating one embodiment of a cluster of the present invention.

FIG. 2 is a schematic block diagram illustrating one embodiment of the cluster 105 of the present invention. The cluster 105 of FIG. 2 may be the cluster 105 of FIG. 1. The description of the cluster 105 refers to elements of FIG. 1, like numbers referring to like elements. The cluster 105 includes a server 205, a plurality of virtualization nodes 210, a tape library 215, and a plurality of data management nodes 220. Although, for simplicity, one server 205 and one tape library 215 are shown with the cluster 105, any number of servers 205 and tape libraries 215 may be employed.

The server 205 may be configured as a computer running an operating system (OS) such as an AIX® OS produced by International Business Machines Corporation (IBM) of Armonk, N.Y., a LINUX® OS, or the like. The server 205 may be connected to the network 105. In addition, virtualization nodes 210 and the data management nodes 220 may execute on the server 205. The server 205 may also act as the data management node 220 and may be identified by an Internet protocol (IP) address while interacting over the Internet.

In an embodiment, each data management node 220 provides magnetic tape drive services. The tape library 215 of each cluster 105 may include a plurality of magnetic tape drives and magnetic tapes that store the data. The data may be accessed, manipulated, replicated, and transferred from or stored to a particular magnetic tape of the tape library 215 as is well known to those of skill in the art.

In an embodiment, each data management node 220 acts as a connection point, a redistribution point, an end point, or the like for data transmission. In addition, each data management node 220 may be programmed to recognize other data management nodes 220, process data, and forward the data or commands to other data management nodes 220. Each data management node 220 may have a media access address or MAC address when the network 105 is configured as the LAN or the WAN. In an embodiment, each data management node 220 is selected from a server, a storage controller, a router, and a bridge.

Each data management node 220 may comprise a central processing unit (CPU), such as for example, a PowerPC® processor produced by IBM, a random access memory (RAM), one or more hard disk drives, two or more network interface (NIC) cards, and the like. In a particular example, the data management node 220 may be a 2U rack mounted unit with a two point four gigahertz (2.4 GHz) integrated circuit (IC) chip, a one gigabyte (1 GB) RAM, and sixteen (16) hard drives of two hundred (200) GB capacity. The hardware components of the plurality of data management nodes 220 may be heterogeneous while software components of each data management node 220 may or may not be the same.

The plurality of data management nodes 220 may communicate peer-to-peer over a plurality internal switches as is well known to those of skill in the art. Each switch may include a plurality of ports to handle all potential data management nodes 220 in the cluster 105. In a particular example, the switches may include one or more Ethernet switches, Gigabit Ethernet GigE switches, or the like.

In an example, the cluster 105 may be implemented within an enterprise environment. The cluster 105 may be accessible by navigating through a site's corporate domain name system (DNS) name server. A host may access the cluster 105 using a conventional interface or an access tool. The host may be a computer running zOS from IBM. An access to the cluster 105 may be carried out over any Internet protocol such as Hypertext Transfer Protocol (HTTP), File Transfer Protocol (FTP), Network File System (NFS), Andrew File System (AFS), Server Message Block (SMB), a Web service, or the like via an application programming interface (API).

In an embodiment, a cluster application may run on a redundant array of independent data management nodes 220 that are networked together for example, via the Ethernet. The server 205 may also host virtualization software such as a hypervisor to create the plurality of virtualization nodes 210 as is well known to those of skill in the art.

The software components for each data management node 220 may comprise one or more transport layers, an application layer, one or more host layers, a gateway protocol layer, an access layer, a file transaction and administration layer, a core components layer, and/or the like as is well known to those of skill in the art. The gateway protocol layer may define one or more links that may be used to transfer data/command among the plurality of clusters 105. In an embodiment, the computer readable program manages each first link at the application layer. In addition, the link management may be transparent to the transport layers and the host layers.

Figure 3:
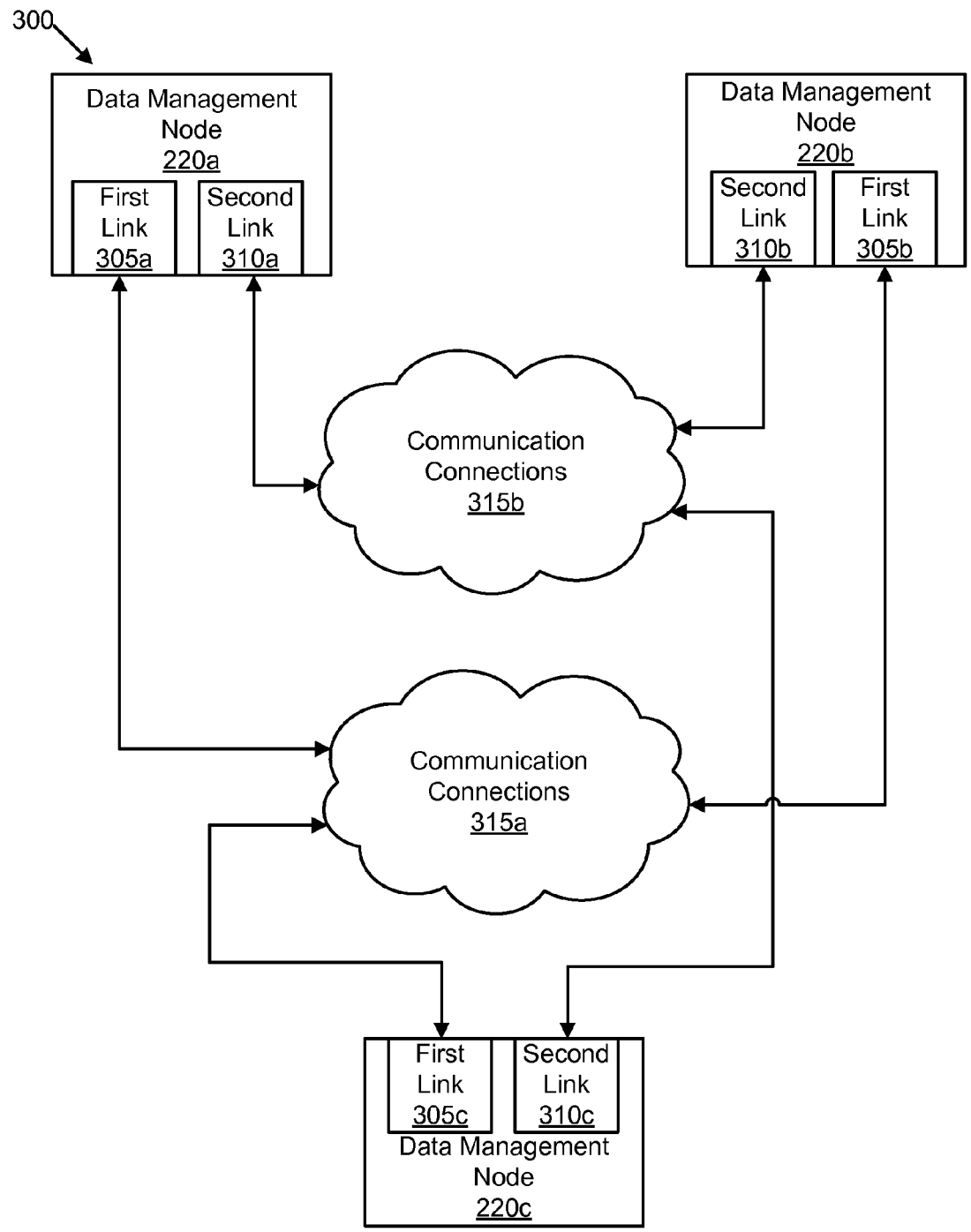
FIG. 3 is a schematic diagram illustrating one embodiment of a system for peer-to-peer communication between data management nodes of the present invention.

FIG. 3 is a schematic diagram illustrating one embodiment of system 300 for peer-to-peer communication between the data management nodes 220 of the present invention. The system 300 includes a plurality of data management nodes 220a-c and a plurality of communication connections 315a-b. Although, for simplicity, the system 300 is shown with three (3) data management nodes 220a-c and two (2) communication connections 315a-b, any number of data management nodes 220 and communication connections 315 may be employed.

In the shown embodiment, the plurality of data management nodes 220a-c include a first link 305a,b,c and a second link 310a,b,c. Each first link 305a,b,c and the second link 310a,b,c may be configured as an actual physical link or a logical link as is well known to those of skill in the art. In one embodiment, the links 305, 310 are a heterogeneous set of link connections. For example, the links 305, 310 may comprise one or more Ethernet connections, one or more token ring networks, an Internet Protocol (IP) over one or more Fibre Channel connections, one or more Asynchronous Traffic Mode (ATM) networks, or the like. In addition, connections and networks may operate at a plurality of speeds and in a plurality of configurations.

The plurality of first links 305a,b,c connect the data management nodes 220a-c. In an embodiment, a remote mount task operates over the links 305. For example, the remote mount task may operate over the first link 305a between the first data management node 220a and the second data management node 220b using a network file system (NFS) protocol on the server 205. In another embodiment, a replication task operates over the links 305. The replication task may be to backup/transfer the data between the plurality of data management nodes 220 using an Internet small computer small interface (iSCSI) protocol on the server 205.

Each first link 305a,b,c and each second link 305a,b,c is further shown in peer-to-peer communication over first communication connections 315a and second communication connections 315b respectively. The communication connections 315a-b may include the network 115, the Ethernet communication channels, the Gigabit Ethernet (GigE) communication channels, and/or the like.

In an embodiment, the communication between the plurality of data management nodes 220a-c is intra-cluster, inter-cluster, or a combination thereof. In addition, each communication connection 315 may provide peer-to-peer communication among the plurality of data management nodes 220a-c. For example, a first data management node 220a, a second data management node 220b, and a third data management node 220c may be the plurality of data management nodes 220 of the first cluster 105a that mutually communicate over the communication connections 315a-b using the links 305. In another example, the first data management node 220a, the second data management node 220b, and the third data management node 220c may be the data management nodes 220 of the first cluster 105a, the second cluster 105b, and the third cluster 105c respectively that mutually communicate over the communication connections 315a-b using the links 305.

In an embodiment, one or more clusters 105 may comprise a domain. The domain of each cluster 105 may comprise a domain name system (DNS). The DNS may be a hierarchical naming system for each cluster 105 over the network 115 for example, configured as the Internet. The DNS may translate a hostname for example, www.cluster1.ibm.com to the IP address for example, 105.66.155.268.

In addition, the first link 305a,b,c or the second link 310a,b,c may include a plurality of link configurations that describe how a data set may be transferred/replicated from a source data management node 220 to a target data management node 220. In one embodiment, the smallest data set is a namespace. In a particular example, the link configuration may include a source cluster DNS name, a target cluster DNS name, an IP address of the source server 205, an IP address of the target server 205, a replication/transfer of data schedule, a transfer protocol or a transport configuration, the namespace of the data to be replicated/transferred, a validation information, and/or the like.

In the past, the data management nodes 220 were taken offline prior to making changes to links 305, 310. The present invention supports changing link configuration without taking data management nodes 220 offline as will be described hereafter.

Figure 4:
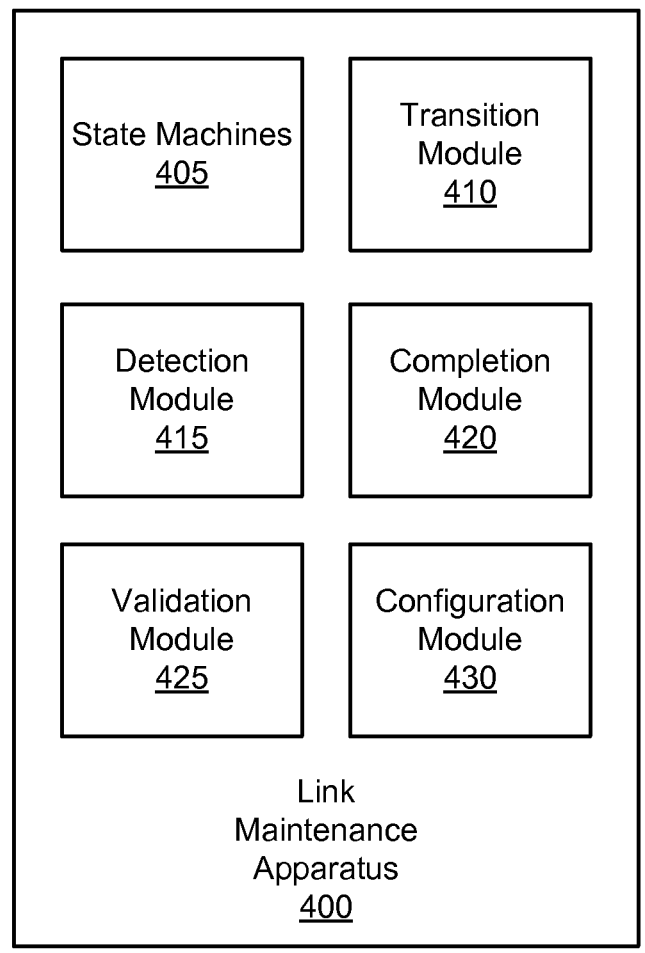
FIG. 4 is a schematic block diagram illustrating one embodiment of a link maintenance apparatus of the present invention.

FIG. 4 is a schematic block diagram illustrating one embodiment of a link maintenance apparatus 400 of the present invention. The apparatus 400 may be embodied in the cluster 105 of FIGS. 1 and 2. The apparatus 400 automatically maintains one or more links 305, 310. The description of the apparatus 400 refers to elements of FIGS. 1-3, like numbers referring to like elements. The apparatus 400 includes one or more state machines 405, a transition module 410, a detection module 415, a completion module 420, a validation module 425, and a configuration module 430.

The plurality of state machines 405 operate a plurality of first links 305a,b,c between the plurality of data management nodes 220a-c with each first link 305a,b,c in an online state. The tasks are communicated over the plurality of first links 305a,b,c in an online state. For example, the remote mount task may be communicated over the plurality of first links 305a,b,c in the online state. In another example, the replication task may be communicated over the plurality of first links 305a,b,c in the online state.

Each state machine 405 may be a model of behavior composed of a finite number of states for a link 305 with transitions between the states of the link 305. The state machines 405 may include a solid-state electronic circuit as is well known to those of skill in the art. Alternatively, the state machines 405 may be implemented in a computer readable program.

In an embodiment, the state machine 405 communicates state transition information and link activity information between the plurality of first links 305a,b,c. In another embodiment, the state machine 405 communicates the state transition information and the link activity information between the plurality of second links 305a,b,c.

The detection module 415 detects a connection failure of at least one first link 305a,b,c. For example, when the data or the command is not transferred over the first link 305a,b,c between the three (3) data management nodes 220a-c, the detection module 415 may detect the connection failure.

The connection failure may be due to a mechanical fault, an electrical fault, compatible issues of the hardware or software components, noise during wireless communication, and/or the like. For example, the detection module 415 may detect the connection failure of the first link 305a due to an electrical fault.

The detection module 415 may include a computer readable program stored on a tangible storage device. The computer readable program may be executed on the server 205 or the data management node 220. In one embodiment, the computer readable program is stored on a memory and executed by a processor of the server 205 and/or the data management node 220.

The transition module 410 transitions a first link 305a from the online state to a degraded state in response to detecting the connection failure. If a data management node 220c attempts to communicate over the first link 305a in the degraded state, the transition module 410 may also transition a first link 305c to the degraded state. The transition module 410 further transitions a first link 305a from the online state to an offline pending state in response to an offline request. The transition module 410 further transitions a first link 305a from the degraded state to an online pending state when a degraded link time interval expires.

The transition module 410 may further transition the plurality of first links 305a,b,c from the offline pending state to an offline state if all pending tasks on the plurality of first links 305a,b,c are completed else in response to a force offline command. The transition module 410 further transitions the plurality of first links 305a,b,c from the online pending state to the online state if each first link 305a,b,c is validated.

The transition module 410 may include a computer readable program stored on a tangible storage device. The computer readable program may be executed on the server 205 or the data management node 220. In one embodiment, the computer readable program is stored on a memory and executed by a processor of the server 205 and/or the data management node 220.

The completion module 420 completes pending tasks on each first link 305a,b,c during the offline pending state. For example, the completion module 420 may complete pending tasks such as replication of data, remote mount, and/or the like on each first link 305a,b,c during the offline pending state. The completion module 420 may include a computer readable program stored on a tangible storage device. The computer readable program may be executed on the server 205 or the data management node 220. In one embodiment, the computer readable program is stored on a memory and executed by a processor of the server 205 and/or the data management node 220.

In one embodiment, the configuration module 430 dynamically changes the configuration of one or more links 305, 310 during an offline state. For example, the configuration module 430 may change link addresses, direct an administrator to replace adapters and/or cables, or the like. The configuration module 430 may include a computer readable program stored on a tangible storage device. The computer readable program may be executed on the server 205 or the data management node 220. In one embodiment, the computer readable program is stored on a memory and executed by a processor of the server 205 and/or the data management node 220.

The validation module 425 validates each first link 305a,b,c during the online pending state. In an embodiment, a digital signature is used to validate each first link 305a,b,c during the online pending state. In addition, a compression option may be selected to enable data compression across the first link 305a,b,c to minimize network bandwidth requirements and an encryption option may be selected to enable encryption for example, a secure socket layer (SSL) for securing the first link 305a,b,c.

The validation module 425 may include a computer readable program stored on a tangible storage device. The computer readable program is executed on the server 205 or the data management node 220. In one embodiment, the computer readable program is stored on a memory and executed by a processor of the server 205 and/or the data management node 220.

Figure 5:
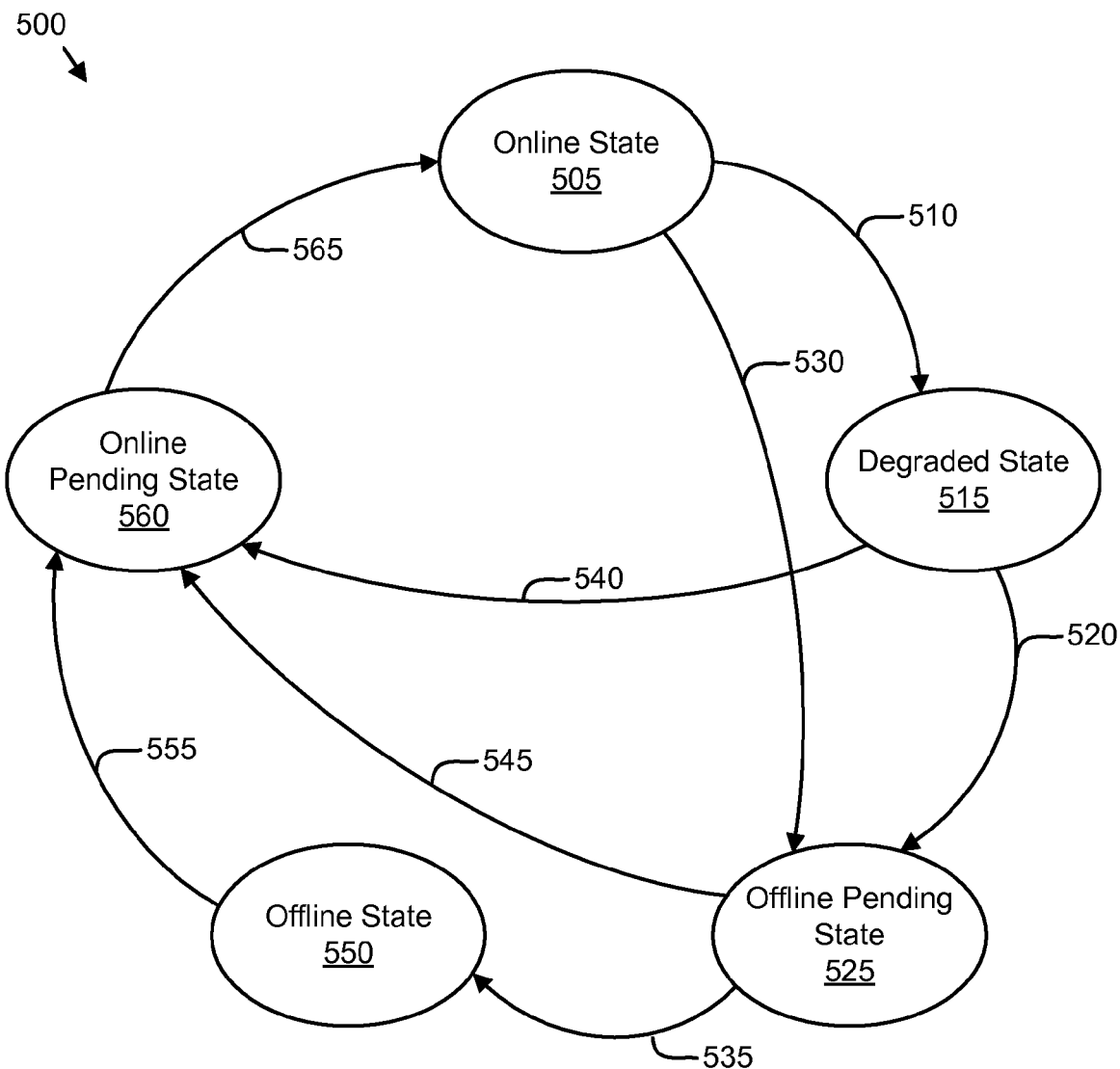
FIG. 5 is a schematic diagram illustrating one embodiment of link states of the present invention.

FIG. 5 is a schematic diagram illustrating one embodiment of a plurality of link states 500 of the present invention. The plurality of link states 500 include an online state 505, a degraded state 515, an offline pending state 525, an offline state 550, and an online pending state 560. Further, the plurality of link states 500 are shown transitioning from one state to another. A plurality of arrows 510, 520, 530, 535, 540, 545, 555, and 565 may represent a transition between link states 500.

In an embodiment, the plurality of first links 305a,b,c each have a state machine 405 comprising the online state 505, the degraded state 515, the offline pending state 525, the offline state 550, and the online pending state 560. For example, each first link 305a,b,c may have a dedicated state machine 405 comprising the link states 500. The second links 305a,b,c may also each have a state machine 405 comprising the online state 505, the degraded state 515, the offline pending state 525, the offline state 550, and the online pending state 560.

The plurality of state machines 405 operate the plurality of first links 305a,b,c between data management nodes 220 with each first link 305a,b,c in the online state 505. In the online state 505 each first link 305a,b,c may be operational. The tasks are communicated over the plurality of first links 305a,b,c in the online state 505. For example, the remote mount task and/or the replication task between data management nodes 220 may be communicated over the plurality of first links 305a,b,c in the online state 505.

The transition module 410 transitions 510 a first link 305a from the online state 505 to the degraded state 515 in response to detecting the connection failure. For example, if the detection module 415 detects the communication error on the first link 305a used for the remote mount task, the remote mount task may fail and the error may then be returned to the server 205 to indicate the connection failure. The transition module 410 may then transition 510 the first link 305a from the online state 505 to the degraded state 515.

A degraded timer may determine a finite period of time for which the first link 305a may remain in the degraded state 515. For example, the degraded timer may determine a finite period of two (2) minutes for which the first link 305a may remain in the degraded state 515.

The transition module 410 further transitions 530 the plurality of first links 305a,b,c from the online state 505 to the offline pending state 525 in response to an offline request. The user may issue the offline request. For example, the user may issue the offline request and in response to the offline request the transition module 410 may transition 530 the plurality of first links 305a,b,c from the online state 505 to the offline pending state 525 as and when required for link maintenance.

In addition, the transition module 410 transitions 540 the plurality of first links 305a,b,c from the degraded state 515 to the online pending state 560 when a degraded link time interval expires. For example, the transition module 410 may transition 540 the first link 305a from the degraded state 515 to the online pending state 560 when the degraded link time interval of two (2) minutes determined by the degraded timer expires.

During the online pending state 560, the computer readable program may send logical configuration information to each first link 305a,b,c. The logical configuration information may include a plurality of IP addresses for each physical link that configure the logical link 305. In addition, the computer readable program may update each first link 305a,b,c with the logical configuration information.

The transition module 410 further transitions 535 the plurality of first links 305a,b,c from the offline pending state 525 to the offline state 550 if all pending tasks on the plurality of first links 305a,b,c are completed. For example, in response to a signal indicating completion of all tasks on the plurality of first links 305a,b,c, the transition module 410 may transition 535 the plurality of first links 305a,b,c from the offline pending state 525 to the offline state 550. In the offline state 550 no data management node 220a-c may be using the plurality of first links 305a,b,c. The first link 305a,b,c may then be safe to perform any maintenance task in the offline state 550.

Alternatively, the transition module 410 transitions 535 the plurality of first links 305a,b,c from the offline pending state 525 to an offline state 550 in response to a force offline command. The user may issue the force offline command. If the user employs the force offline command, errors may occur as the first links 305a,b,c go to the offline pending state 525 without completing pending tasks.

During the offline state 550, the data management nodes 220 remain online. In one embodiment, the configuration module 430 dynamically changes the configuration of one or more links 305, 310 during the offline state 550.

The transition module 410 further transitions 565 the plurality of first links 305a,b,c from the online pending state 560 to the online state 505 if each first link 305a,b,c is validated. For example, if the validation module 425 validates each first link 305a,b,c using the digital signature, the transition module 410 may transition 565 the plurality of first links 305a,b,c from the online pending state 560 to the online state 505. The plurality of first links 305a,b,c may then be online or operational.

The transition module 410 may transition 520 the plurality of first links 305a,b,c from the degraded state 515 to the offline pending state 525 in response to the offline request. The user may issue the offline request. For example, in response to the offline request, the transition module 410 may transition 520 the first link 305a from the degraded state 515 to the offline pending state 525.

In an embodiment, the transition module 410 transitions 545 the plurality of first links 305a,b,c from the offline pending state 525 to the online pending state 560 in response to an online request. The user may issue the online request. For example, in response to the online request the transition module 410 may transition 545 the first link 305a from the offline pending state 525 to the online pending state 560.

In another embodiment, the transition module 410 transitions 555 the plurality of first links 305a,b,c from the offline state 550 to the online pending state 560 in response to the online request. The user may issue the online request. For example, in response to the online request the transition module 410 may transition 555 the first link 305a from the offline state 550 to the online pending state 560.

In one more embodiment, the transition module 410 transitions 530 a state machine 405 of a second link 305a,b,c to a same state as a first link 305a,b,c if the second link 305a,b,c shares hardware with the first link 305a,b,c. The hardware may include the communication connections 315. For example, if the second link 305b and the first link 305a share the communication connections 315, the transition module 410 may transition 530 the state machine 405 of the second link 305b to the offline pending state 525.

The offline pending state 525 completes pending tasks on each first link 305a,b,c. For example, in the offline pending state 525 the first link 305a may not be available for any future replication task and/or remote mounting task. The user may issue a force offline command to force the transition to the offline state 550. Thus, in the offline state 550 the user may carry out concurrent maintenance on the first link 305a.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
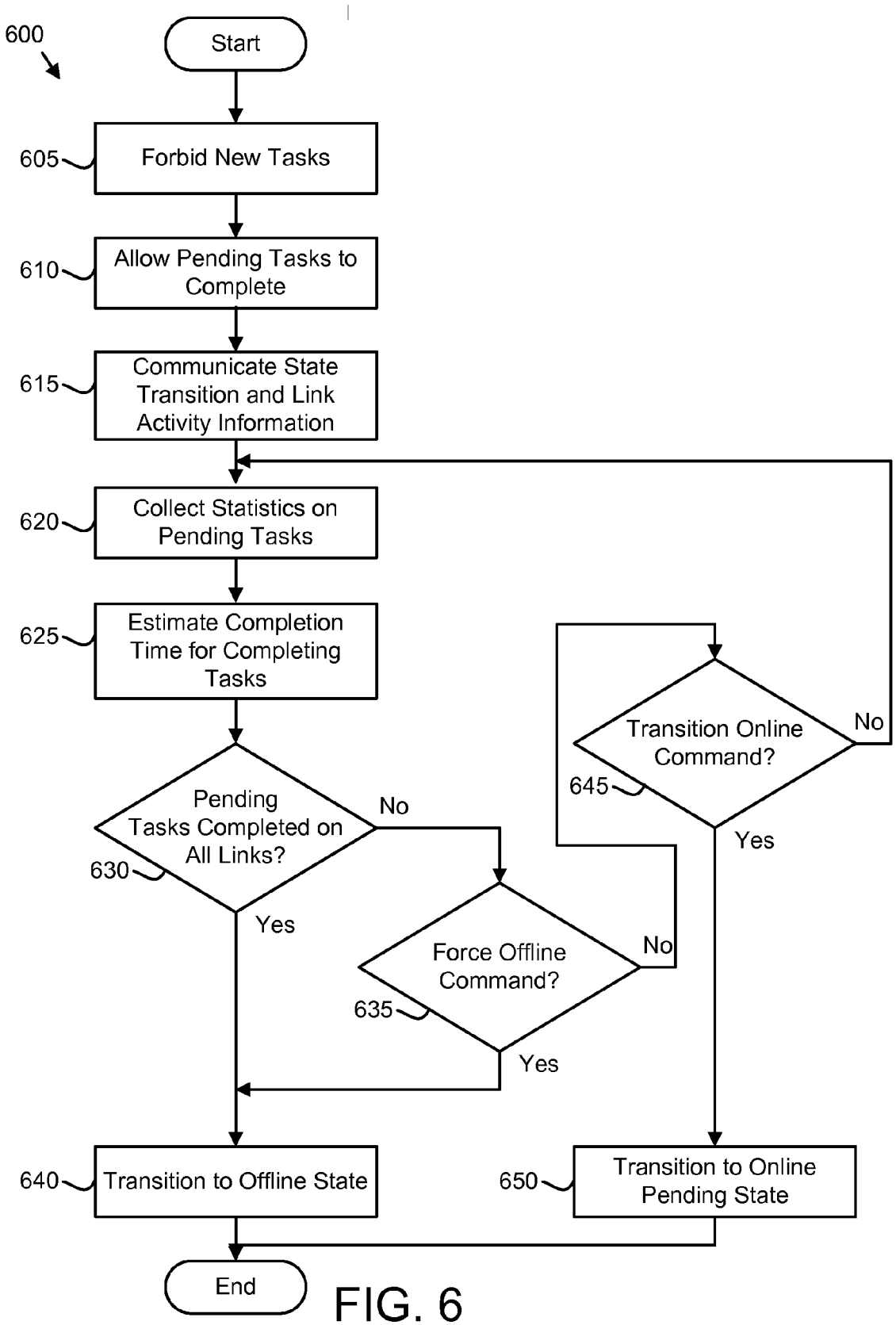
FIG. 6 is a schematic flow chart diagram illustrating one embodiment of a method for completing pending tasks of the present invention.

FIG. 6 is a schematic flow chart diagram illustrating one embodiment of a method 600 for completing pending tasks of the present invention. The method 600 substantially includes the steps to carry out the functions presented above with respect to the operation of the described link states 500, apparatus 400, and DPS 100. In particular, the method 600 may be performed during the offline pending state 525 of FIG. 5. The description of the method 600 refers to elements of FIGS. 1-5, like numbers referring to the like elements. In one embodiment, the method 600 is implemented with a computer readable storage medium comprising a computer readable program stored on a tangible storage device. The computer readable program may be executed by the processors of the server 205 and/or the data management nodes 220.

The method 600 starts, and in an embodiment, during the offline pending state 525 the state machine 405 forbids 605 new tasks on each first link 305a,b,c. For example, the user may issue the user offline request to transition 530 the state machine 405 operating the first link 305a on the first data management node 220a of the plurality of three (3) data management nodes 220a-c to the offline pending state 525. Continuing with the example, during the offline pending state 525 the state machine 405 may forbid 605 any new remote mount task and/or data replication task on each first link 305a,b,c that use the communication connections 315a.

The offline pending state 525 completes 610 pending tasks on each first link 305a,b,c. For example, the offline pending state 525 may allow and complete 610 any pending task such as the replication of data, the remote mount, and/or the like on each first link 305a,b,c. In an alternate embodiment, the offline pending state 525 may allow and complete 610 any pending task until a completion time interval is expired. The completion module 410 may then terminate any remaining tasks.

Meanwhile, the state machine 405 may further communicate 615 state transition information and link activity information between the plurality of first links 305a,b,c. In an embodiment, the state machine 405 polls the plurality of data management nodes 220 for link activity information from an initiating node. For example, the first data management node 220a may act as the initiating node. Continuing with the example, the state machine 405 may poll the second data management node 220b and/or the third data management node 220c for the link activity information of the first links 305b,c respectively from first data management node 220a by sending a message to the second data management node 220b and the third data management node 220c to generate and gather link activity information.

The state machine 405 may further report the link activity information from at least one data management node 220 to the initiating data management node 220. For example, the second data management node 220b and the third data management node 220c may report the link activity information of the first link 305b,c to the initiating data management node 220a using the communication connections 315a associated with the first links 305b,c.

During the offline pending state 525 the state machine 405 further may collect 620 statistics on the pending tasks on each first link 305a,b,c. The state machine 405 may estimate 625 a completion time for completing the pending tasks on each first link 305a,b,c during the offline pending state 525. For example, the state machine 405 may estimate 625 the completion time of five (5) minutes for completing the pending replication tasks on the first link 305a during the offline pending state 525.

The completion module 420 may determine 630 if pending tasks are complete on all links 305. For example, the completion module 420 may determine 630 pending tasks are complete on the first link 305a on expiration of the completion time of five (5) minutes.

If the completion module 420 determines 630 that all the pending tasks are completed on all first links 305a,b,c, the transition module 410 transitions 640 the plurality of first links 305a,b,c from the offline pending state 525 to an offline state 550 and the method 600 ends. For example, if the completion module 420 determines 630 that all the pending tasks are completed on the first link 305a, the transition module 410 may transition 640 the first link 305a,b,c from the offline pending state 525 to the offline state 550.

If the completion module 420 determines 630 that all the pending tasks are not completed on all first links 305a,b,c, the state machine 405 may further determine 635 if there is a force offline command. For example, if the user issues the force offline command, the state machine 405 may determine 635 that there is a force offline command.

If the state machine 405 determines 635 that there is a force offline command, the transition module 410 transitions 640 the first link 305a,b,c from the offline pending state 525 to the offline state 550. For example, if the state machine 405 determines 635 that there is a force offline command issued by the user on the first link 305a, the transition module 410 may transition 640 the first link 305a from the offline pending state 525 to the offline state 550. In the offline state 550 the user may carry necessary link maintenance on the communication connection 315a associated with the first link 305a.

If the state machine 405 determines 635 that there is not a force offline command, the state machine 405 may further determine 645 if there is a transition online command. The transition online command may be the online request. For example, if the user issues the online request, the state machine 405 may determine 635 that there is an online request issued by the user.

If the state machine 405 determines 645 that there is not a transition online command, the method 600 loops to the step 620. If the state machine 405 determines 645 that there is a transition online command, the transition module 410 transitions 650 the plurality of first links 305a,b,c from the offline pending state 525 to the online pending state 560 and the method 600 terminates. For example, if the state machine 405 determines 645 that there is a transition online command issued by the user, the transition module 410 may transition 650, 545 the first links 305a from the offline pending state 525 to the online pending state 560. Thus, the method 600 for completing pending tasks allows the user to carry on link maintenance on the communication connection 315 without forcing one or more data management nodes 220 offline.

The present invention automates link maintenance. Beneficially, such an apparatus, system, and method would not require forcing one or more data management nodes 220 offline by allowing concurrent maintenance of one or more links 305, 310. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium comprising a computer readable program stored on a tangible storage device for link maintenance, wherein the computer readable program when executed on a computer causes the computer to:
   operate a plurality of first links between data management nodes of clusters, wherein each cluster comprises a tape library, each first link is in an online state, and tasks are communicated between data management nodes over the plurality of first links in the online state;
   transition the plurality of first links from the online state to a degraded state in response to a connection failure of at least one first link for a remote mount at a first tape library;
   transition the plurality of first links from the online state to an offline pending state in response to an offline request, wherein the offline pending state completes pending tasks on each first link and forbids new remote mount tasks at the first tape library and new data replication tasks for the first tape library on each first link;
   transition the plurality of first links from the degraded state to an online pending state in response to a degraded link time interval expiring, wherein the online pending state validates each first link using a digital signature;
   transition the plurality of first links from the degraded state to the offline pending state in response to the offline request occurring before the degraded link time interval expires;
   transition the plurality of first links from the offline pending state to an offline state if all pending tasks on the plurality of first links are completed else in response to a force offline command; and
   transition the plurality of first links from the online pending state to the online state if each first link is validated using the digital signature.

2. The non-transitory computer readable storage medium of claim 1, wherein the computer readable program further causes the computer to:
   transition the plurality of first links from the offline pending state to the online pending state in response to an online request; and
   transition the plurality of first links from the offline state to the online pending state in response to the online request.

3. The non-transitory computer readable storage medium of claim 2, wherein the plurality of first links each have a state machine comprising the online state, the degraded state, the offline pending state, the offline state, and the online pending state.

4. The non-transitory computer readable storage medium of claim 3, wherein the computer readable program further causes the computer to transition a state machine of a second link to the offline pending state if the second link shares hardware with the first link.

5. The non-transitory computer readable program of claim 1, wherein the computer readable program further causes the computer to communicate state transition information and link activity information between the plurality of first links.

6. The non-transitory computer readable program of claim 5, wherein the computer readable program further causes the computer to communicate the state transition information and the link activity information between a plurality of second links.

7. The non-transitory computer readable program of claim 1, wherein the computer readable program further causes the computer to poll the data management nodes for link activity information from an initiating data management node.

8. The non-transitory computer readable program of claim 7, wherein the computer readable program further causes the computer to report link activity information from at least one data management node to the initiating data management node.

9. The non-transitory computer readable storage medium of claim 1, wherein during the offline pending state the computer readable program further causes to the computer to:
   collect statistics on the pending tasks on each first link; and
   estimate a completion time for completing the pending tasks on each first link.

10. The non-transitory computer readable storage medium of claim 1, wherein each data management node provides magnetic tape drive services.

11. The non-transitory computer readable storage medium of claim 10, wherein the remote mount task operates over the first links.

12. The non-transitory computer readable storage medium of claim 10, wherein a replication task operates over the first links.

13. The non-transitory computer readable storage medium of claim 1, wherein the computer readable program further causes the computer to manage each first link at an application layer, the link management transparent to transport layers and host layers.

14. The non-transitory computer readable storage medium of claim 1, wherein the computer readable program further causes the computer to send logical configuration information to each first link during the online pending state, updating each first link with the logical configuration information.

15. An apparatus for link maintenance, the apparatus comprising:
   a plurality of state machines operating a plurality of first links between data management nodes of clusters, wherein each cluster comprises a tape library, each first link is in an online state, and tasks are communicated between data management nodes over the plurality of first links in the online state;

a detection module detecting a connection failure of at least one first link for a remote mount at a first tape library;

a transition module transitioning the plurality of first links from the online state to a degraded state in response to detecting the connection failure;

the transition module further transitioning the plurality of first links from the online state to an offline pending state in response to an offline request;

a completion module completing pending tasks on each first link during the offline pending state and forbidding new remote mount tasks at the first tape library and new data replication tasks for the first tape library on each first link;

the transition module further transitioning the plurality of first links from the degraded state to an online pending state in response to a degraded link time interval expiring;

a validation module validating each first link during the online pending state using a digital signature;

the transition module further transitioning the plurality of first links from the degraded state to the offline pending state in response to the offline request occurring before the degraded link time interval expires;

the transition module further transitioning the plurality of first links from the offline pending state to an offline state if all pending tasks on the plurality of first links are completed else in response to a force offline command; and the transition module further transitioning the plurality of first links from the online pending state to the online state if each first link is validated using the digital signature.

16. The apparatus of claim 15, the transition module further configured to:

transition the plurality of first links from the offline pending state to the online pending state in response to an online request; and transition the plurality of first links from the offline state to the online pending state in response to the online request.

17. The apparatus of claim 16, wherein during the offline pending state the state machine further:

collects statistics on the pending tasks on each first link; and estimates a completion time for completing the pending tasks on each first link.

18. A system for link maintenance, the system comprising:

a plurality of data management nodes of clusters, wherein each cluster comprises a tape library;

a plurality of first links connecting the data management nodes;

a plurality of state machines operating the plurality of first links with each first link in an online state, wherein tasks are communicated between data management nodes over the plurality of first links in the online state;

a detection module detecting a connection failure of at least one first link for a remote mount at a first tape library;

a transition module transitioning the plurality of first links from the online state to a degraded state in response to detecting the connection failure;

the transition module further transitioning the plurality of first links from the online state to an offline pending state in response to an offline request;

a completion module completing pending tasks on each first link during the offline pending state and forbidding new remote mount tasks at the first tape library and new data replication tasks for the first tape library on each first link;

the transition module further transitioning the plurality of first links from the degraded state to an online pending state in response to a degraded link time interval expiring;

a validation module validating each first link during the online pending state using a digital signature;

the transition module further transitioning the plurality of first links from the degraded state to the offline pending state in response to the offline request occurring before the degraded link time interval expires;

the transition module further transitioning the plurality of first links from the offline pending state to an offline state if all pending tasks on the plurality of first links are completed else in response to a force offline command; and the transition module further transitioning the plurality of first links from the online pending state to the online state if each first link is validated using the digital signature.

19. The system of claim 18, wherein each data management node is selected from a server, a storage controller, a router, and a bridge.

20. A method for deploying computer infrastructure, comprising integrating a computer readable program stored on a tangible storage device into a computing system, wherein the program in combination with the computing system performs the following:

operating a plurality of first links between data management nodes of clusters, wherein each cluster comprises a tape library, each first link is in an online state, and tasks are communicated between data management nodes over the plurality of first links in the online state;

transitioning the plurality of first links from the online state to a degraded state in response to a connection failure of at least one first link for a remote mount at a first tape library;

transitioning the plurality of first links from the online state to an offline pending state in response to an offline request, wherein the offline pending state completes pending tasks on each first link and forbids new remote mount tasks at the first tape library and new data replication tasks for the first tape library on each first link;

transitioning the plurality of first links from the degraded state to an online pending state in response to a degraded link time interval expiring, wherein the online pending state validates each first link using a digital signature;

transitioning the plurality of first links from the degraded state to the offline pending state in response to the offline request occurring before the degraded link time interval expires;

transitioning the plurality of first links from the offline pending state to an offline state if all pending tasks on the plurality of first links are completed else in response to a force offline command;

transitioning the plurality of first links from the offline state to the online pending state in response to the online request;

transitioning the plurality of first links from the offline pending state to the online pending state in response to an online request; and transitioning the plurality of first links from the online pending state to the online state if each first link is validated using the digital signature.

\* \* \* \* \*